US005175699A

United States Patent [19]

Podkowa et al.

[11] Patent Number: 5,175,699

[45] Date of Patent: Dec. 29, 1992

[54] LOW-POWER CLOCK/CALENDAR ARCHITECTURE

[75] Inventors: William J. Podkowa; Clark R. Williams, both of Plano, Tex.

[73] Assignee: Dallas Semiconductor Corp., Dallas, Tex.

[21] Appl. No.: 264,233

[22] Filed: Oct. 28, 1988

[51] Int. Cl.[5] ........ G06F 15/20; G06F 13/00

[52] U.S. Cl. ........ 364/569; 364/DIG. 2

[58] Field of Search ........ 368/71-73, 368/242-243, 250; 364/200 MS File, 900 MS File, 569; 371/16.3

[56] References Cited

U.S. PATENT DOCUMENTS

| | | | |
|---|---|---|---|
| 4,088,990 | 5/1978 | Sass | 368/223 |
| 4,301,524 | 11/1981 | Koepp et al. | 368/251 |
| 4,379,339 | 4/1983 | Narita | 364/900 |
| 4,385,841 | 5/1983 | Kramer | 368/82 |
| 4,386,423 | 5/1983 | Sasaki et al. | 368/73 |
| 4,427,299 | 1/1984 | Hasegawa | 368/73 |
| 4,444,512 | 4/1984 | Piguet et al. | 368/72 |
| 4,677,541 | 6/1987 | Singhi | 364/900 |
| 4,852,030 | 7/1989 | Munday | 364/569 |
| 4,930,100 | 5/1990 | Morinaga et al. | 364/569 |
| 5,050,113 | 9/1991 | Podkowa et al. | 364/569 |

OTHER PUBLICATIONS

Data sheet from the 1987 Data Book of Dallas Semiconductor, Inc. describing the "DS1215" part, pp. 193-208.

*Primary Examiner*—Joseph L. Dixon

*Attorney, Agent, or Firm*—Worsham, Forsythe, Sampels & Wooldridge

[57] ABSTRACT

An integrated circuit timekeeper, which uses a hybrid hardware/software architecture, wherein the least significant bits are updated in hardware and the more significant bits are updated in software. This hybrid architecture provides improved power efficiency, layout efficiency, and flexibility in reconfiguration.

20 Claims, 12 Drawing Sheets

SEQUENCER FLOW CHART

ALARM SEQUENCE FLOW CHART

LOW-POWER CLOCK/CALENDAR ARCHITECTURE

CROSS REFERENCE TO OTHER APPLICATIONS

The following applications of common assignee contain some disclosure and drawings in common with the present application:

Ser. No. 264,193, Filed Oct. 28, 1988, entitled FEEDBACK-CONTROLLED OSCILLATOR, now issued as U.S. Pat. Nos. 4,871,982 and 4,912,435; and Ser. No. 264,125, Filed Oct. 28, 1988, entitled INTEGRATED CIRCUIT WITH REMAPPABLE INTERRUPT PINS, pending.

BACKGROUND AND SUMMARY OF THE INVENTION

The present invention relates to integrated circuits which perform clock/calendar maintenance functions (alone or in combination with other functions).

The present invention, in the presently preferred embodiment, provides a clock/calendar circuit, within an integrated circuit, wherein a dedicated hardware register tracks the hundredths-of-second data, but uses software registers for the other clock/calendar information (including seconds, minutes, hours, day, date, month, and year information).

A more common way to implement this functionality would be to track essentially all of this data in hardware, or track essentially all of it in software. An example of the former approach is the DS1215 integrated circuit (or DS1216 socket), and an example of the latter approach is the integrated circuit in the DS1287 timing module; both of these parts, and their data sheets, are available from Dallas Semiconductor Corporation (DSC), 4350 Beltwood Parkway South, Dallas 75244. The contents of both of these parts, and their descriptions in the 1988 DSC Data Book, are hereby incorporated by reference.

The use of programmable logic for the more significant fields of data saves space, and provides system designers with additional flexibility. However, in a low power circuit, it has been discovered that tracking the hundredths data in software leads to excess power consumption: although the standby power of the circuits may be small, the charge transferred during the 100 active operations every second produces a significant net average power consumption.

Thus, the division of the hardware and software implementation of timekeeping functions helps to provide optimal compactness and power consumption. Thus, this combination is advantageous, and is particularly advantageous in a battery-backed circuit, where power must be stringently conserved.

BRIEF DESCRIPTION OF THE DRAWING

The present invention will be described with reference to the accompanying drawings, which are hereby incorporated by reference, wherein.

DESCRIPTION OF THE PREFERRED EMBODIMENTS

The present invention will now be described in great detail with reference to a sample preferred embodiment. However, it must be realized this embodiment is illustrative only. As will be recognized by those skilled in the art, a wide variety of modifications and variations can be made to still take advantage of the inventive concepts.

Figure 1:
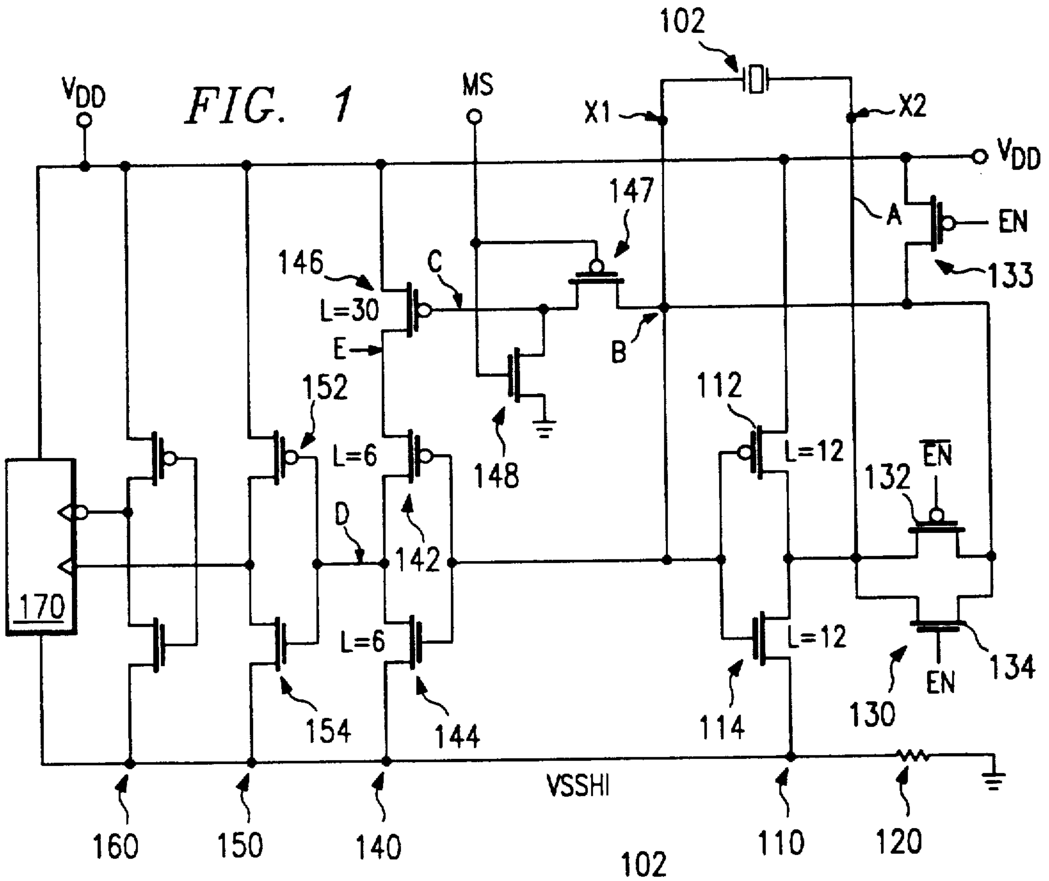
FIG. 1 shows a first embodiment of a low power frequency-stabilized CMOS oscillator which can be used in the system of FIG. 4.
Figure 4:
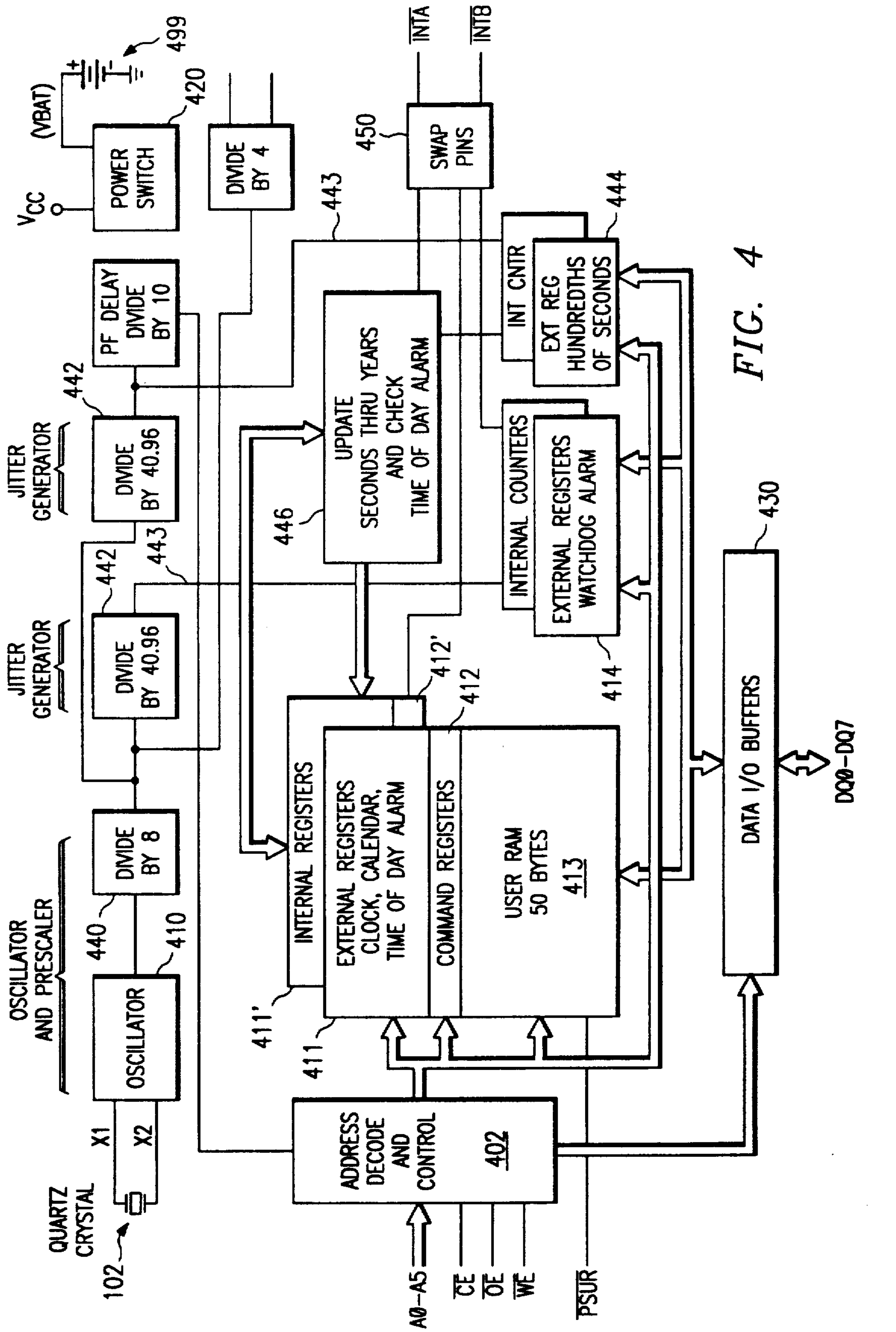
FIG. 4 shows the overall organization of a sample system embodiment employing the oscillator of FIG. 1.
Figure 6:
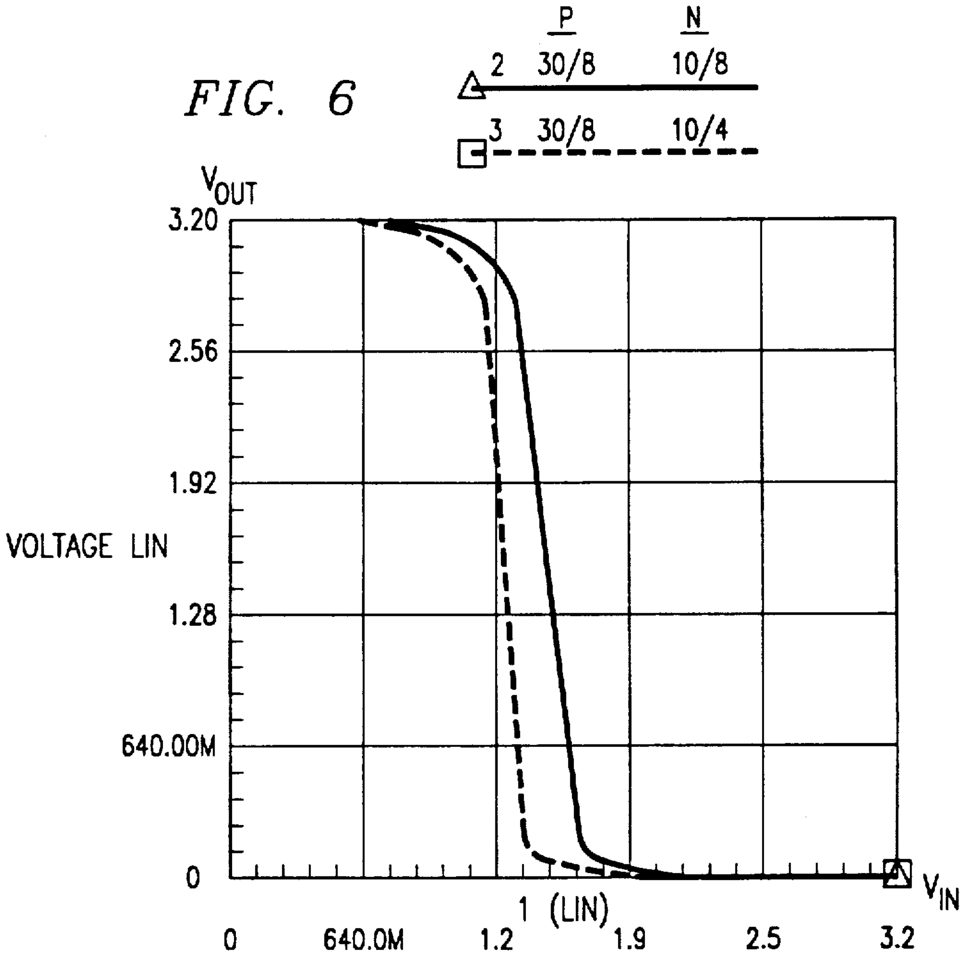
FIG. 6 shows a typical curve of output voltage ($V_{out}$) versus input voltage ($V_{in}$) behavior of an inverter stage for a typical MOS inverter circuit.

FIG. 4 shows a sample embodiment of an integrated circuit which employs the disclosed innovative timing architecture. This sample subsystem embodiment uses the timing capabilities of a precision oscillator as shown in FIG. 1 to provide the timing reference. This embodiment provides a battery-backed clock circuit, which retains a very accurate time signal even when system power goes down. In addition, in a larger subsystem environment, the timing function is also used to monitor the activity of a microprocessor. For example, if a processor has not shown any activity on the pins being monitored over a certain length of time (for example one second or 100 seconds), this subsystem may be programmed to activate a signal which would indicate to the system that the microprocessor may have crashed. (This capability is referred to as the WatchDog (TM) mode of operation.)

In the presently preferred embodiment, the logic shown in FIG. 4 as update logic 446 is actually configured, in conventional fashion, as an ALU in combination with a sequencer. In the presently preferred embodiment, the hardware configuration of the sequencer and of the components is chosen, to minimize power consumption, as follows.

The sequencer, in the presently preferred embodiment, operates at a clock rate of 4096 Hz. However, the sequencer only uses as many clock cycles per second as it actually needs. That is, after completing its updating and comparison functions, the sequencer will go to sleep until it receives another interrupt from the hundredths register 444 (indicating that the hundredths count has again increased to 0.99.)

The hundredths register 444 is implemented in hardware, as described above. The sequencer is sequentially incremented, as described above, and carries information in BCD (binary-coded decimal) format. When the hundredths register has counted up to 0.99, it generates a hardware interrupt to the sequencer on its next increment.

The hundredths register, in the presently preferred embodiment, is externally accessible. However, the other timekeeping registers are not directly externally accessible. Instead, as discussed in detail below, parallel internally-accessible and externally-accessible registers are maintained. A master countdown chain provides a global transfer signal: the hundredths register is updated every 0.01 seconds, but the other registers are updated only every second.

When the sequencer receives this hardware interrupt from the hundredths register 444, it fetches the seconds data, increments it, and replaces it. If (and only if) the seconds data has rolled over (e.g., if the seconds data is being incremented from 59 to 00), the sequencer fetches the minutes value and increments and stores it. Thus, in general, the sequencer preferably follows a "smart" procedure, whereby the sequencer executes a program with a branch at each possible rollover, so that only the minimum number of programmed steps necessary to correctly update the clock/calendar data are performed. That is, this procedure is maximally branched on possible rollovers, so that steps which are only necessary after a rollover are not performed unless a rollover has occurred.

After the time-of-day information has been updated in this fashion, the sequencer also compares the updated time-of-day information with the stored value for time-of-day alarm (if the mask bit to enable the time-of-day alarm has been turned on). Again, for maximal power conservation, this comparison two is made in a maximally branched fashion.

To compare times, the sequencer, in the presently preferred embodiment, uses a procedure which begins with a comparison of the least significant bits. That is, the minutes data of the updated time is compared against the minute data field in the time-of-day alarm data. If and only if these two fields match, the sequencer then compares the hours data of the two data fields. If and only if the hours values match, the sequencer goes on to compare the day-of-of week data. Of course, in alternative embodiments where timing operations are desirable over longer durations, similar comparison operations can be performed using date data, month data, and year data. Alternatively, if the timing target values are not to be restricted to minutes, a seconds comparison may be performed before the minute comparison, etc.

Alternatively, the two sequential comparison operations just described may be interleaved if desired. That is, the updated seconds data can be compared with the time-of-day alarm seconds data, if desired, immediately after the updated seconds data is generated.

FIG. 8 shows schematically the sequence of program steps preferably used to implement the above-described logical relations in the sequencer. Of course, as will be well understood by those skilled in the art, a wide variety of other software configurations could be used instead.

The foregoing description indicates how the hundredths register 444, together with the sequencer 446, is used in the time-of-day clock/calendar operation. For clarity, it should be noted that there are actually two hundredths registers on the chip. One of the hundredths register is used, as described above, to maintain the hundredths data for the time-of-day monitoring, and the other is part of the Watchdog Timer. In the presently preferred embodiment, the Watchdog Timer is implemented entirely in hardware.

In this configuration, the sequencer requires an average current consumption of only about one and a half nanoamps. (By contrast, if all of the calendar update and comparison functions just referred to were implemented in hardware, using essentially the same device and process technology, the power consumption would be in the neighborhood of 30 nanoamps, or roughly 20 times as high.) On the other hand, if all of the updating functions just referred to, including updating of the hundredths data, were implemented in software, the power consumption (again, using the same technology) would be in the neighborhood of 150 nanoamps, or nearly two orders of magnitude higher.

Thus, it may be seen that the calendar update architecture just referred to provides substantial advantages in power consumption.

It should also be noted that the use of a sequencer, in the presently preferred embodiment, provides substantial additional flexibility beyond that which would be available in an all-hardware environment. For example, if it were desired to maintain more than two timing processes simultaneously, this could be done simply by adding another hundredths register, with minimal changes to the sequencer. Similarly, if it is desired to maintain multiple time-of-day alarm targets, the sequencer logic could simply be modified slightly, to compare the updated time-of-day against each of the alarm targets. Similarly, if some alarm targets required comparison of hundredths of second information, and other required comparison only to an accuracy of seconds, tens of seconds, minutes, or other such choice, these alternatives are easily implemented in the software programming of the sequencer.

The use of a hybrid hardware/software architecture of this sort is itself believed to be novel. However, a further subpoint is that it is particularly advantageous to maintain the data for seconds (and higher-order bits) in software, and to maintain the data for fractions of a second in hardware. For example, the innovative teachings set forth herein can also be adapted for configurations where:

- seconds and higher-order fields are maintained in software, and a data field for tenths of seconds is maintained in hardware;
- seconds and higher-order fields are maintained in software, and a data field for thousandths of seconds is maintained in hardware;
- tenths of seconds and higher-order fields are maintained in software, and a data field for hundredths and thousandths of seconds is maintained in hardware;
- minutes and higher-order fields are maintained in software, and seconds and lower-order fields are maintained in hardware;
- tens of seconds and higher-order fields are maintained in software, and seconds and lower-order fields are maintained in hardware.

It should also be noted that the innovative teachings set forth herein may be particularly advantageous for low-power real-time applications.

As a further alternative, instead of the interrupt-driven relation between the sequencer and the hundredths register, the sequencer can be configured to poll the hundredths register regularly.

Note also that although BCD data storage is used in the presently preferred embodiment, this is not at all necessary. Of course, a wide variety of clock/calendar format implementations can be used.

It should be noted that the innovative hardware/software hybrid timing architecture disclosed can be combined with a variety of other functions. For example, in the presently preferred embodiment this is combined with an all-hardware timing circuit (the watchdog timer).

In FIG. 4, oscillator 410 includes the stages shown separately, in FIG. 1, as 110, 140, 130, 150, and 160. Divide-by-8 circuit 440 includes three flip-flops 170 (one of which is shown in FIG. 1, and each of the two divide-by-40.96 circuits 442 is implemented using a counter, as discussed above. One of the resulting 100 Hz outputs 443 is provided, through the watchdog alarm counter, as an output, and one is provided, through Hundredths register 444, to updating logic 446.

This integrated circuit provides a compact system, including a self contained Real Time Clock, Alarm, Watchdog Timer, and Interval Timer, in a 28 pin JEDEC DIP package. The integrated circuit is preferably packaged together with an embedded lithium energy source 499 and a quartz crystal 102, which eliminates need for any external circuitry. Data contained within 64 eight bit registers 411–414 and 444 (shown in FIG. 4) can be read or written in the same manner as bytewide static RAM. Data is maintained by intelligent control circuitry which detects the status of system power supply $V_{cc}$ and write-protects memory when $V_{cc}$ is out of tolerance. The lithium energy source 499 can maintain data and real time for over ten years in the absence of $V_{cc}$. The clock information includes hundredths of seconds, seconds, minutes, hours, day, date, month, and year information. The date at the end of the month is automatically adjusted for months with less than 31 days, including correction for leap years. The realtime clock operates in either 24 hour or 12 hour format with AM/PM indicator. The timer provides alarm windows and interval timing between 0.01 seconds and 99.99 seconds. The real time alarm provides for preset times of up to one week.

The integrated circuit executes a read cycle, under control of address decode/control logic 402, whenever WE* (Write Enable complemented) is inactive (high) and CE* (Chip Enable complemented) and OE* (Output Enable complemented) are active (low). The unique address specified by the six address inputs (A0–A5) defines which of the 64 registers 411–413 is to be accessed. Valid data will be available to the eight data output drivers 430 within $t_{Acc}$ (Access Time, which in the presently preferred embodiment is specified at 150 nsec) after the last address input signal is stable, providing that CE* and OE* access times are also satisfied. If OE* and CE* access times are not satisfied, then data access must be measured from the latter occurring signal (CE* or OE*), and the limiting parameter is either $t_{co}$ (150 nsec, in the presently preferred embodiment) after the CE* transition, or $t_{OE}$ (75 nsec, in the presently preferred embodiment) after the OE* transition, rather than address access.

The integrated circuit is in the write mode whenever the WE* (Write Enable) and CE* (Chip Enable) signals are in the active (Low) state after the address inputs are stable. The latter occurring on a falling edge of CE* or WE* will determine the start of a write cycle. The write cycle is terminated by the earlier rising edge of CE* or WE*. All address inputs must be kept valid throughout the write cycle. WE* must return to the high state for a minimum recovery state ($t_{WR}$, which in the presently preferred embodiment is specified at 10 nsec) before another cycle can be initiated. Data must be valid on the data bus with sufficient Data Set Up Time ($t_{DS}$, which in the presently preferred embodiment is 60 nsec) with respect to the earlier rising edge of CE* or WE*. The OE* control signal should be kept inactive (High) during write cycles to avoid bus contention. However, if the output bus has been enabled (CE* and OE* active), then WE* will disable the outputs in $t_{ODW}$ (which in the presently preferred embodiment is 50 nsec) from its falling edge.

This integrated circuit provides full functional capability when $V_{CC}$ is greater than 4.5 Volts, and write protects the register contents at 4.25 Volts typical. Data is maintained in the absence of $V_{CC}$ without any additional support circuitry. The supply voltage is constantly monitored, and, if it begins to fall, all inputs to the registers become Don't Care. However, the two interrupts INTA* and INTB* (INTB) and the internal clock and timers continue to run regardless of the level of $V_{CC}$. As $V_{CC}$ falls below approximately 3.0 Volts, a power switching circuit 420 connects the internal lithium energy source 499, to maintain the clock and timer data and functionality. During power up, when $V_{CC}$ rises above approximately 3.0 Volts, the power switching circuit 420 connects external $V_{CC}$ and disconnects the internal lithium energy source 499. Normal operation can resume after $V_{CC}$ exceeds 4.5 Volts for a period of 150 msec.

The integrated circuit also has 64 8-bit registers 411, 412, 413, 414, and 444, which contain all of the Timekeeping, Alarm, Watchdog, Control, and Data information. These registers are memory locations which contain external (user accessible) registers 411 and 412, 413, 414, and 444, as well as internal registers 411', 412', 414', and 444' which contain additional copies of the data. The external copies are independent of internal functions, except that they are updated periodically by the simultaneous transfer of the incremental internal copy. The Command Register bits are affected by both internal and external functions. This register will be discussed later. The 50 bytes of user RAM registers 413 can only be accessed from the external address and data bus.

The preferred organization of registers 411–414 and 444 will now be discussed in greater detail. Registers 0, 1, 2, 4, 6, 8, 9 and A (within registers 411 and 444) contain time of day and date information. (Specifically, register 444 contains the hundredths-of-second information, and in software this register is referred to as register 0.) Time of Day information is stored in BCD (binary-coded decimal) format. Registers 3, 5, and 7 contain the Time of Day Alarm Information. Time of Day Alarm Information is stored in BCD. Register B provides the Command Register 412, and information in this register is binary. Registers C and D provide the Watchdog Alarm Registers 414, and information in these two registers is in BCD. Registers E through 3F provide user RAM 413, and can be used to contain data at the user's discretion.

Registers 0, 1, 2, 4, 6, 8, 9, and A contain Time of Day data in BCD. Ten bits within these eight registers are not used and will always read zero regardless of how they are written. Bits 6 and 7 in the Months Register (9) are binary bits. When set to logical zero, EOSC (Bit 7) enables the Real Time Clock oscillator. This bit is set to logical one when the integrated circuit is shipped, to prevent drain on lithium energy source 499 during storage and shipment. This bit will normally be turned on by the user during device initialization. However, the oscillator can be turned on and off as necessary by setting this bit to the appropriate level. Bit 6 of this same byte controls the Square Wave Output (pin 24). When ɜt to logical zero, the Square Wave Output Pin will utput a 1024 Hz Square Wave Signal. When set to ɔgic one the Square Wave Output Pin is in a high npedance state. Bit 6 of the Hours Register is defined s the 12 or 24 Hour Select Bit. When set to logic one, ɪe 12 Hour Format is selected. In the 12 Hour Format, lit 5 is the AM/PM Bit with logical one being PM. In ɪe 24 hour Mode, Bit 5 is the Second 10 Hour bit 20-23 hours). The Time of Day Registers are updated very 0.01 seconds from the Real Time Clock, except when the TE bit (Bit 7 of Register B) is set low or the lock oscillator is not running.

The preferred method of synchronizing data access o and from the real-time clock is to access the Comnand Register 412 by doing a write cycle to address ocation OB and setting the TE bit (Transfer Enable bit) o logic zero. This will freeze the External Time of Day Registers at the present recorded time, allowing access o occur without danger of simultaneous update. When he watch registers have been read or written, a second vrite cycle is made to location OB, setting the TE bit to logic one. (This will put the time of Day Registers back to being updated every 0.01 second.) No time is ost in the Real Time Clock, because the internal copy of the Time of Day Registers buffers are continually ncremented while the external memory registers are frozen. An alternate method of reading and writing the Time of Day Registers is to ignore synchronization. However, any single read may give erroneous data, since the Real Time Clock may be in the process of updating the external memory registers as data is being read. The internal copies of seconds through years are ncremented, and Time of Day Alarm is checked, durng any period when hundreds of seconds reads 99, and are transferred to the external register when hundredths of seconds roll from 99 to 00. A way of making sure data is valid is to do multiple reads and compare. Similarly, another way of making sure that the write cycle has caused proper update is to do read verifies and re-execute the write cycle if data is not correct. The probability of an incorrect result is kept to a minimum due to the redundant structure of the Watchdog Time-Keeper.

Registers 3, 5, and 7 contain the Time of Day Alarm Registers. Bits 3, 4, 5, and 6 of Register 7 will always read zero regardless of how they are written. Bit 7 of Registers 3, 5, and 7 are mask bits. When all of the mask bits are logical zero, a Time of Day Alarm will only occur when Registers 2, 4, and 6 match the values stored in Registers 3, 5, and 7. An alarm will be generated every day when Bit 7 of Register 7 is set to a logical one. Similarly, an alarm is generated every hour when Bit 7 of Register 5 is set to a logical 1. If Bit 7 of Register 3 is set to a logical 1, an alarm will occur every minute when Register 1 (seconds) rolls from 59 to 00.

Time of Day Alarm Registers are written and read in the same format as the Time of Day Registers. The Time of Day Alarm Flag and Interrupt is always cleared when Alarm Registers are read or written.

Registers C and D contain the time for the Watchdog Alarm. The two registers contain a time count from 00.01 to 99.99 seconds in BCD. The value written into the Watchdog Alarm Registers can be written or read in any order. Any access to Register C or D will cause the Watchdog Alarm to reinitialize and clears the Watchdog Flag Bit and the Watchdog Interrupt Output. When a new value is entered or the Watchdog Registers are read, the Watchdog timer will start counting down from the entered value to zero. When zero is reached, the Watchdog Interrupt Output will go to the inactive state. The Watchdog Timer Countdown is interrupted and reinitialized back to the entered value every time either of the registers are accessed. In this manner, controlled periodic accesses to the Watchdog Time can prevent the Watchdog Alarm from ever going to an active level. If access does not occur, countdown alarm will be repetitive. The Watchdog Alarm Registers always read the entered value. The actual count down register is internal and is not readable. Writing registers C and D to zero will disable the Watchdog Alarm Feature.

Address location OB is the Command Register 412 where mask bit, control bits, and flag bits reside.

Bit 0 is the Time of Day Alarm Flag (TDF). When this bit is set internally to a logical one, an alarm has occurred. The time of the alarm can be determined by reading the Time of Day Alarm Registers. However, if the transfer enable bit is set to logical zero the Time of Day registers may not reflect the exact time that the alarm occurred. This bit is read only, and writing this register has no effect on the bit. The bit is reset when any of the Time of Day Alarm Registers are read.

Bit 1 is the Watchdog Alarm Flag (WAF). When this bit is set internally to a logical one, a Watchdog Alarm has occurred. This bit is read only and writing this register has no effect on the bit. The bit is reset when any of the Watchdog Registers are accessed.

Bit 2 of the Command Register 412 contains the Time of Day Alarm Mask Bit (TDM). When this bit is written to a logical one, the Time of Day Alarm Interrupt Output is deactivated regardless of the value of the Time of Day Alarm Flag. When TDM is set to logical zero, the Time of Day Interrupt Output will go to the active state which is determined by bits 0, 4, 5, and 6 of the Command Register 412.

Bit 3 of the Command Register 412 contains the Watchdog Alarm Mask Bit (WAM). When this bit is written to a logical one, the Watchdog Interrupt Output is deactivated regardless of the value in the Watchdog Alarm Registers. When WAM is set to logic zero, the Watchdog Interrupt Output will go to the active state which is determined by bits 1, 4, 5, and 6 of the Command Register 412. These four bits define how Pin-Swap Logic 450 will operate the Interrupt Output Pins INTA* and INTB* (INTB).

Bit 4 of the Command Register 412 determines whether both interrupts will output a pulse or level when activated. If Bit 4 is set to logic one, the pulse mode is selected. In this case the INTA and INTB will be driven for a minimum of 3 msec when activated.

When Bit 5 is set to logic one, the B interrupt will source current. When Bit 5 is set to logical zero, the B interrupt will sink current.

Bit 6 of the Command Register 412 directs which type of interrupt will be present on interrupt pins INTA* or INTB* (INTB). When set to logical one, INTA* becomes the Time of Day Alarm Interrupt Pin and INTB* (INTB) becomes the Watchdog Interrupt Pin. When Bit 6 is set to logical zero, the interrupt functions are reversed such that the Time of Day Alarm will be output on INTB* (INTB) and the Watchdog Interrupt will be output on INTA*. Caution should be exercised when dynamically setting this bit as the interrupts will be reversed even if in an active state.

Bit 7 of the Command Register 412 is for Transfer Enable (TE)

Figure 7:
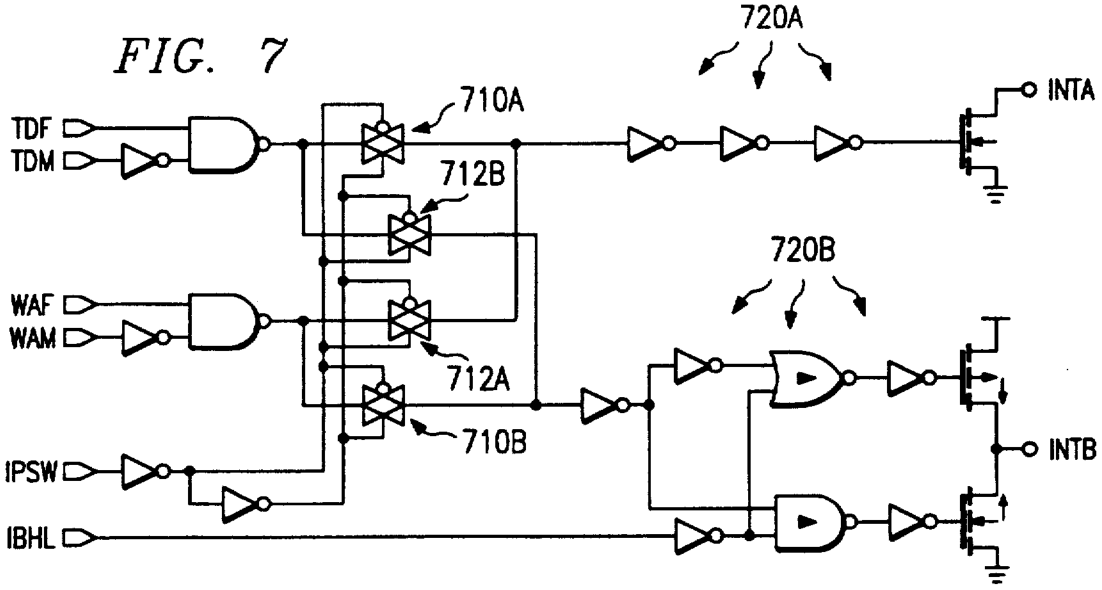
FIG. 7 shows the detailed circuitry preferably used, in the presently preferred embodiment, to remap interrupts.
Figure 8A:
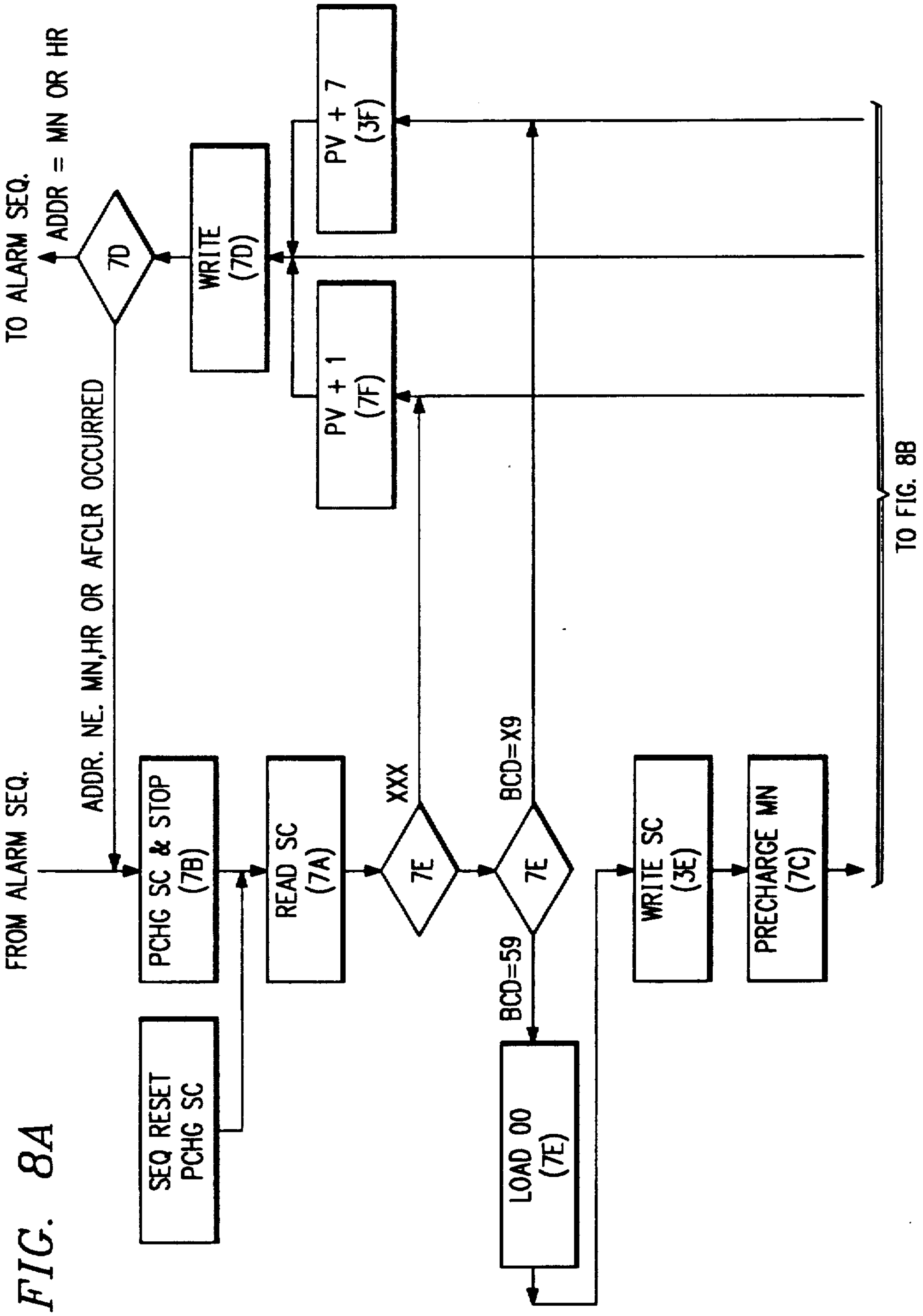
FIGS. 8A-H show schematically the sequence of program steps preferably used to implement the above-described logical relations in the sequencer.
Figure 8B:
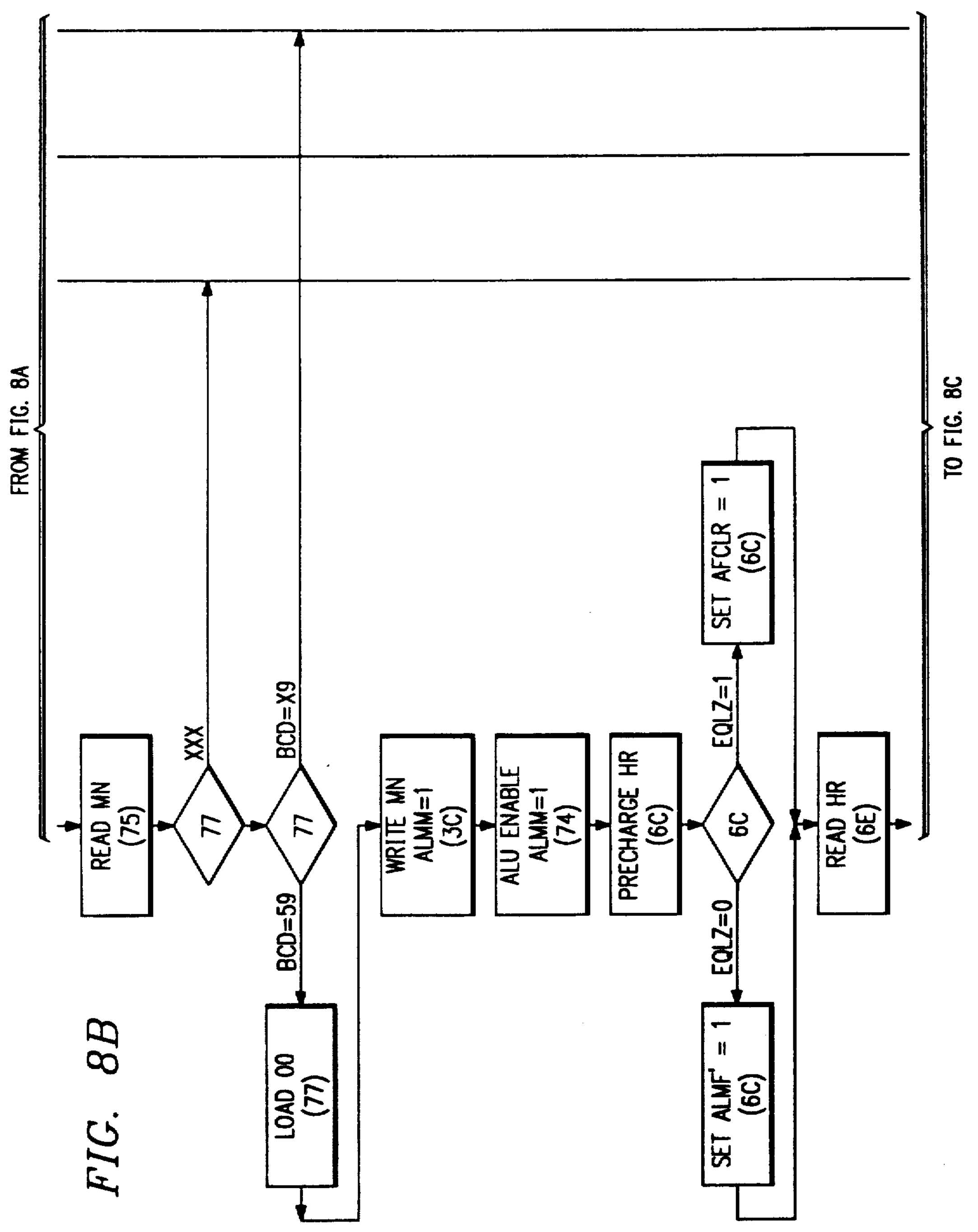
Figure 8C:
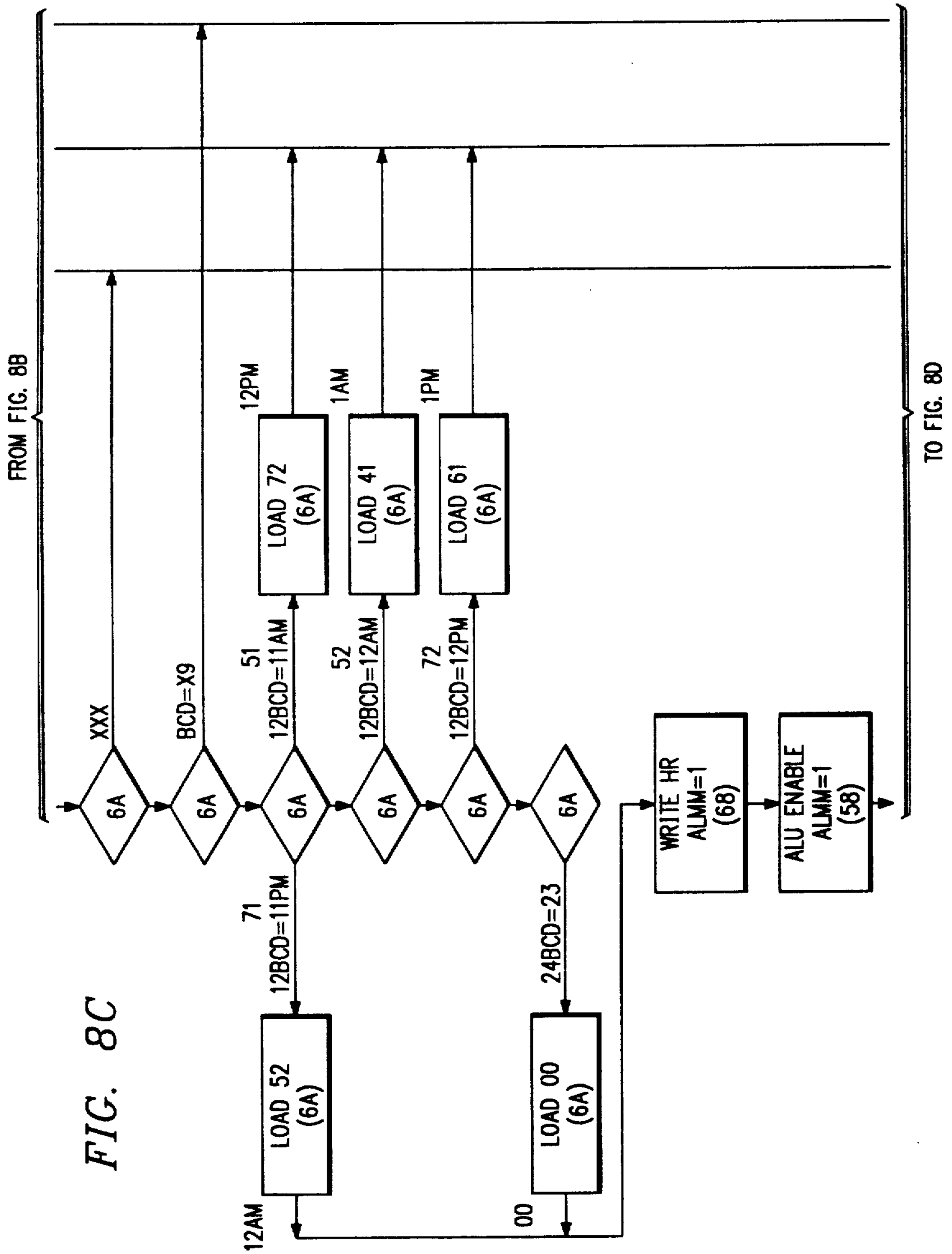
Figure 8D:
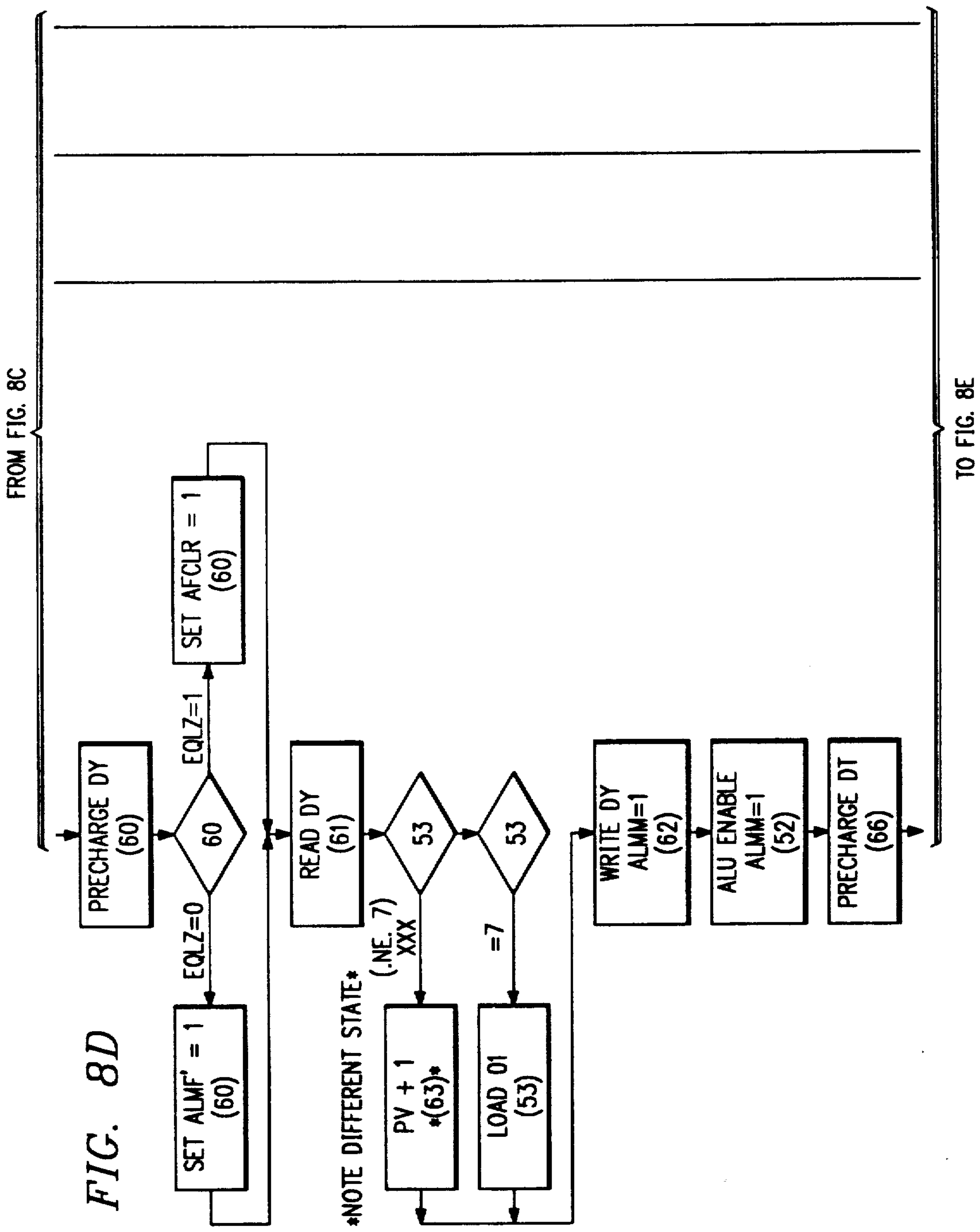
Figure 8E:
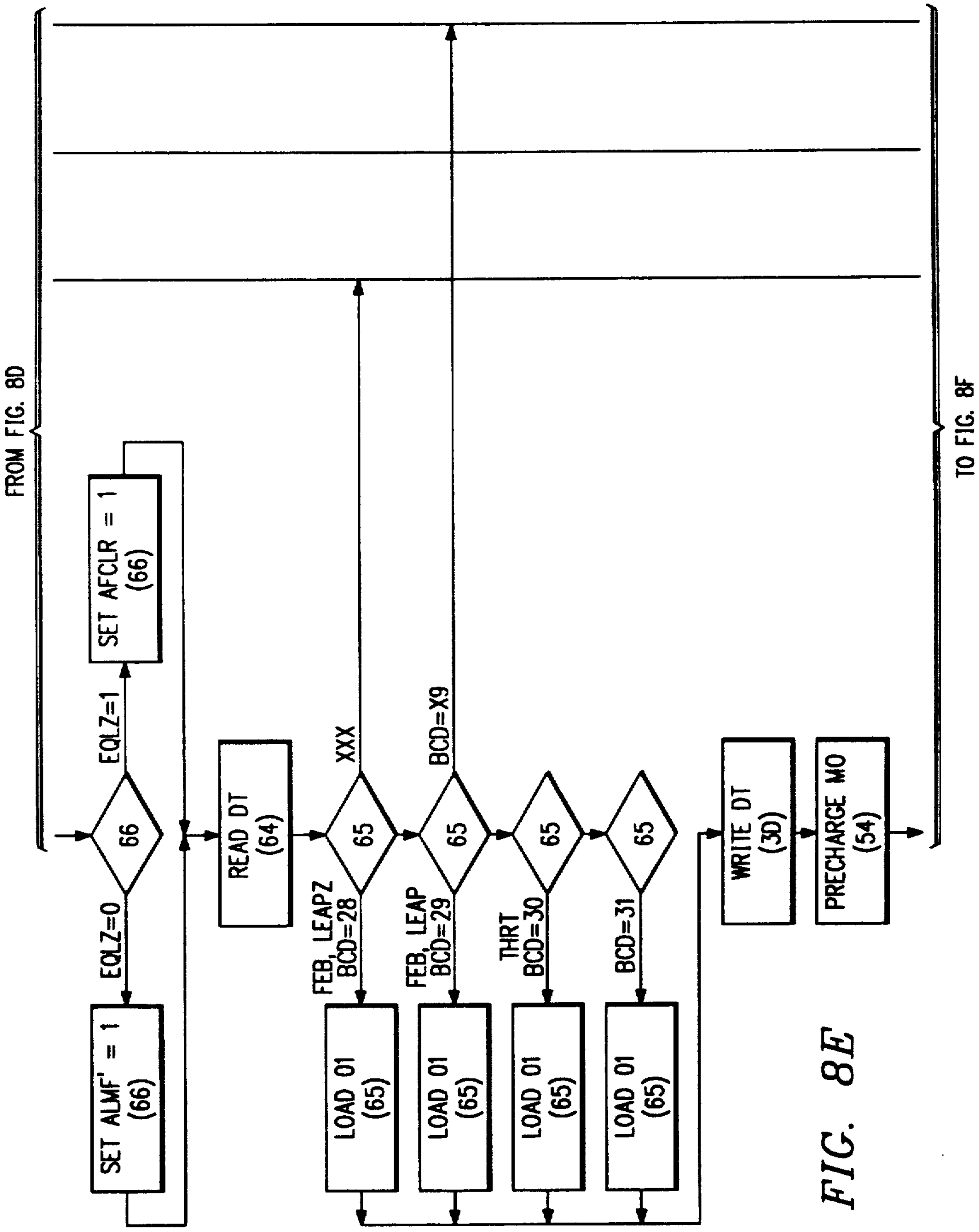
Figure 8F:
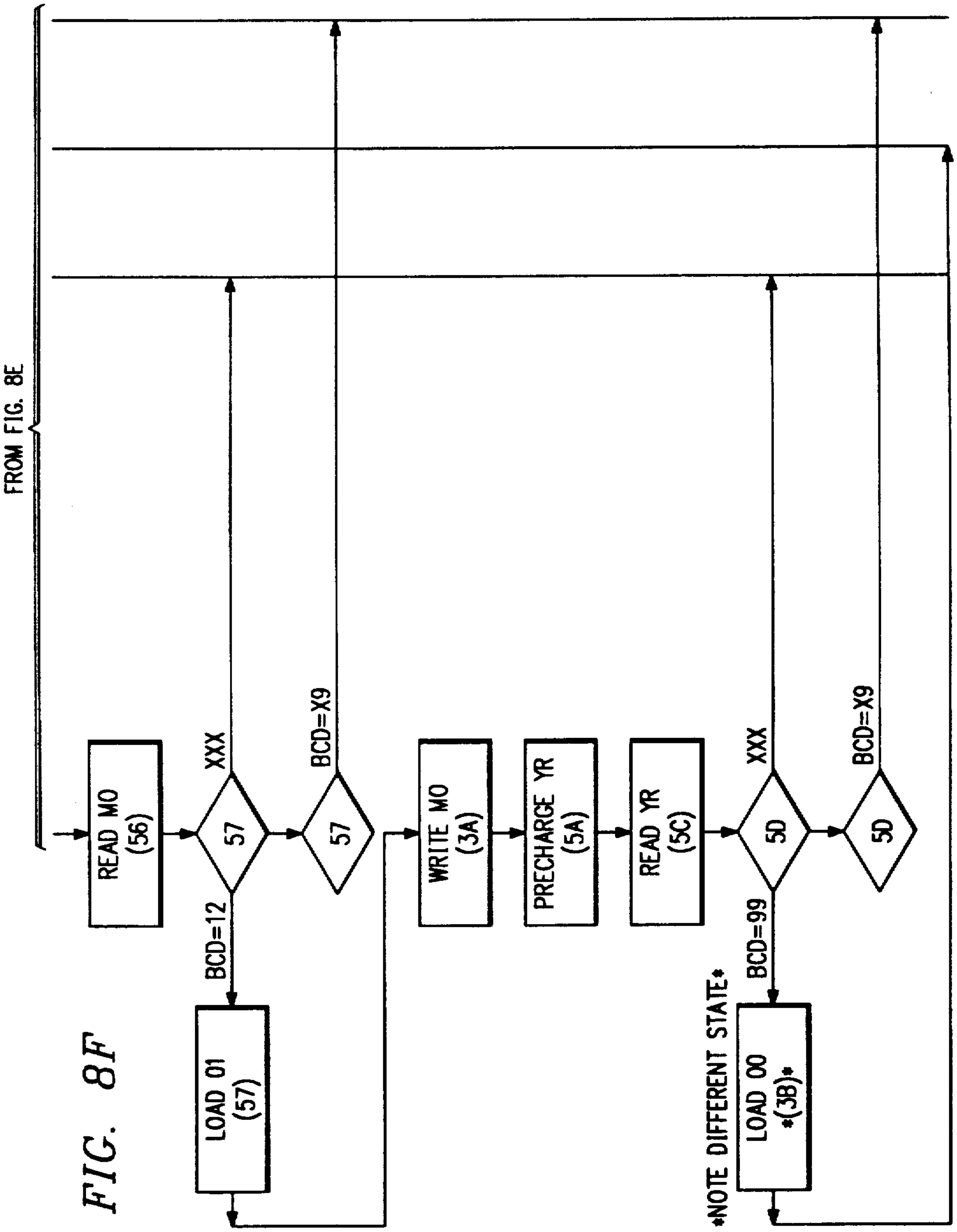
Figure 8G:
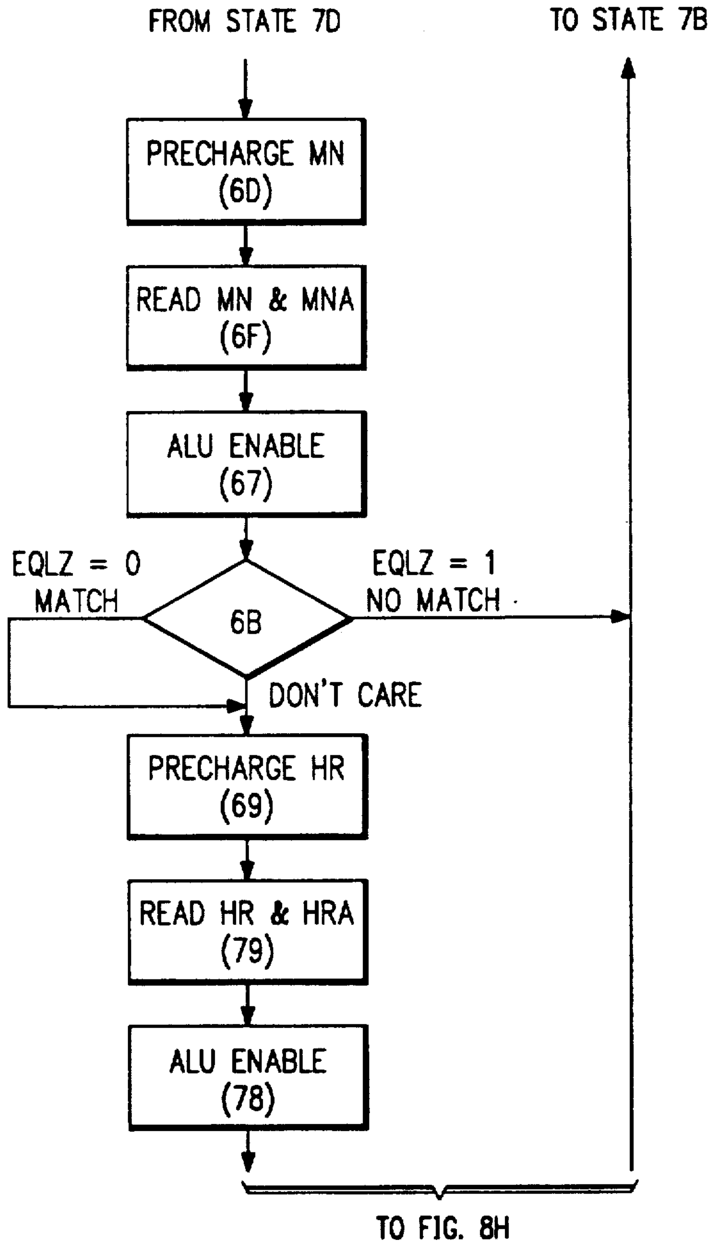
Figure 8H:
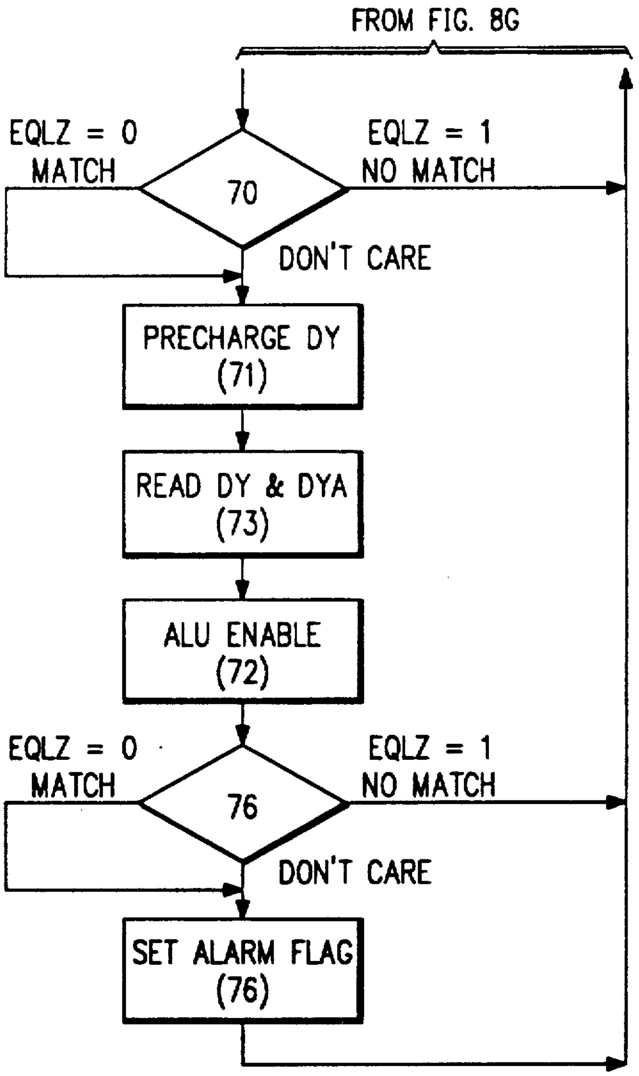

FIG. 7 shows the detailed circuitry preferably used, in the presently preferred embodiment, to remap outgoing interrupt signals to one pin or another, and to modify the electrical format of the outgoing interrupt signals.

Transmission gates 710A, 710B, 712A, and 712B control the connection of signal lines WAF and TDF to output buffer 720A (which drives the contact pad leading to pin INTA) and output buffer 720B (which drives the contact pad leading to pin INTB). When signal IPSW is high, transmission gates 710A and 710B will be turned on, so that internal line WAF (masked by WAM) will drive pin INTB and internal line TDF (masked by TDM) will drive pin INTA. When signal IPSW is low, transmission gates 712A and 712B will be turned on, so that internal line TDF (masked by TDM) will drive pin INTB and internal line WAF (masked by WAM) will drive pin INTA.

Relative device dimensions are shown for some of the logic gates: the dimension "WP" indicates the width of the PMOS transistors (in microns, unscaled), and the dimension "WN" indicates the (unscaled) width of the NMOS transistors. Channel lengths are 2 microns, except where noted otherwise. Where not specified, inverters and transmission gates have a PMOS width of 16 and an NMOS width of 6.5; NAND and NOR gates use a PMOS channel width of 16, and an NMOS channel width of 13 (microns unscaled). As is well known to those skilled in the art of integrated circuit design, straightforward scaling rules can be applied to shrink these dimensions.

Note also that signal IBHL determines whether the signal on pin INTB will be active-high or active-low.

The signals TDF and WAF are also modified by other logic which is not shown in FIG. 7. If pulse-mode operation has been selected, as described above, then a signal on lines TDF or WAF will be cut off after 10 milliseconds by an internal timing circuit.

Since the subsystem environment of the preferred embodiment is intended to be proof against a system power failure, a wide range of voltages must be tolerated on the on-chip power supply ($V_{DD}$). Normally, the system power supply voltage ($V_{CC}$) will be specified to a range between 4.5 and 5.5 Volts. The battery 499 (shown in FIG. 4) provides a backup for the system power supply. However, to avoid excessive drain on the battery, the battery 499 will be connected to provide the on-chip power supply $V_{DD}$ only when the system voltage falls down as low as three Volts. Therefore, the local supply voltage $V_{DD}$ seen by the timing circuit may range from 5.5 Volts (when the system is operating, and at the high end of its voltage range) all the way down to 2.5 Volts (when the battery back-up has been activated, and is operating at the low end of its voltage range).

FIG. 1 shows a sample embodiment of a low-power CMOS oscillator for use in the integrated circuit system of FIG. 4. A crystal 102 is shown at the top of the Figure (but of course this crystal would normally be separate from the integrated circuit containing the active elements shown). In the presently preferred embodiment, this crystal is a quartz crystal with a resonant frequency of 32.768 kHz, which is specified to an accuracy of 20 parts per million. (Such a crystal will typically have a Q of about 75000.)

This crystal is connected across a CMOS amplifier stage 110. This amplifier stage contains a pull-up transistor 112 and a pull-down transistor 114. In the presently preferred embodiment, the pull-up transistor 112 has a channel length of 12 microns, and the pull-down transistor 114 has a channel length of 12 microns also.

The pull-up transistor 112 is a PMOS enhancement mode transistor, and the pull-down transistor 114 is an N-channel insulated-gate (NMOS) enhancement mode transistor. The gates of these two devices are commonly connected to a node B at one side of the crystal, and their outputs are connected to a node A, at the other side of the crystal. In device 112, a back-gate connection is made to the supply voltage $V_{DD}$ (which in this embodiment may vary from 2.5 to 5.5 Volts), and a back gate connection for transistor 114 is made to a virtual ground (local supply voltage) $V_{SSH1}$, which will be between 0.5 and 1.5 Volts (when $V_{DD}$ is 2.5 Volts) under typical operating conditions.

The source resistor 120, in the presently preferred embodiment, has a value in the range of 8 to 10 Megohms, but of course other values could be used. (Alternatively, an active element could be substituted for all or part of this resistor, but this is less preferred). The source resistor minimizes power consumption, by providing a virtual ground level for the oscillator (and for the first stages of the output buffer) which is far above the system ground voltage. When the oscillator is operating, the virtual ground level will be defined by the device threshold voltages (and will be equal to approximately one PMOS threshold voltage ($V_{TP}$) plus one NMOS threshold voltage ($V_{TN}$) below the on-chip positive supply voltage ($V_{DD}$)); but the source resistor will regulate the current consumed by the active circuits.

The output of the amplifier 110 is also connected to a transmission gate 130. This transmission gate includes an NMOS transistor 134 and a PMOS transistor 132, both with very long channels, connected in parallel. During steady-state operation, the gates of these two transistors are connected to substantially DC voltages (at nodes EN and EN*). (These lines are used differently to start oscillation at power-up, as will be described below.) This transmission gate preferably will have significant body effect, so that the effective threshold voltages of the devices in the transmission gate are increased slightly in magnitude. Therefore, even though the gates of the devices in the transmission gate are tied to $V_{DD}$ and $V_{SSH1}$, the transmission gate will be barely off if the bias at node B (as shown in FIG. 1) is optimal. However, if the bias point needs to be shifted, the tranmission gate 130 will pass charge accordingly. The back bias connection of transistor 132 is to the supply voltage $V_{DD}$, and the back channel connection of transistor 134 is to supply voltage $V_{SSH1}$. In the present preferred embodiment, these transistors are each 2600 microns long.

The pull-up transistor 133 guarantees a low power state when the oscillator is turned off. In this state (where signal EN is low, and transmission gate 130 is therefore turned off), transistor 133 will pull node B high. This assures that p-channel transistors 112 and 142 will be turned off, and that n-channel transistors 114 and 144 will be turned on. Therefore, no current will flow through resistor 120, and voltage $V_{SSH1}$ will be equal to ground potential (zero volts). This helps assure low power consumption during standby mode, and also helps to guarantee a predictable turn-on sequence when oscillation is initiated.

The output of this transmission gate 130 is connected across to the input side of the amplifier stage 110. AC coupling from node A to node B will occur primarily through the crystal 102. The coupling through transmission gate 130 is quasi-DC, and serves to set the bias point of node B. The AC signal coupled through the crystal from node A to node B will be appropriately biased to drive the first stage 140 of the output buffer.

The first stage 140 of the output buffer is a somewhat unusual CMOS buffer stage. In addition to a driver transistor 144 and a load transistor 142, this stage also includes a pass transistor 146. In the presently preferred embodiment, the driver transistor and load transistor are both 6 microns long, but the pass transistor is 30 microns long.

Additional logic is included to control the pass transistor 146 in accordance with an external mode-select signal. A first mode-select transistor 147 (which is a PMOS transistor) connects the gate of the pass transistor to node B, if the mode-select signal goes low. The second mode-select transistor 148 (which is NMOS) connects the gate of the pass transistor to system ground (zero Volts, rather than the virtual ground) to turn this transistor hard on in a second mode.

During operation of the oscillator, if mode-select transistor 147 is turned on, pass transistor 146, load transistor 142, and pull-up transistor 112 will receive the same signal on their gates. However, since mode-select transistor 147 has a much longer channel than pull-up transistor 112 or load transistor 142, it will have a higher effective impedance when these transistors are just turned on (i.e. if node B is just below $V_{DD}-V_{TP}$). Thus, in this mode, much more current will be passed by amplifier 110 than by first stage 140. This helps to maximize loop gain.

In addition, the use of transistor 146 also permits the transistors of the first stage 140 to be made somewhat shorter than they otherwise would. Since transistor 147 provides a higher impedance when needed, transistor 142 and 144 can be made shorter, and transistor 112 and 114 can be much longer than would otherwise be desirable.

Figure 3:
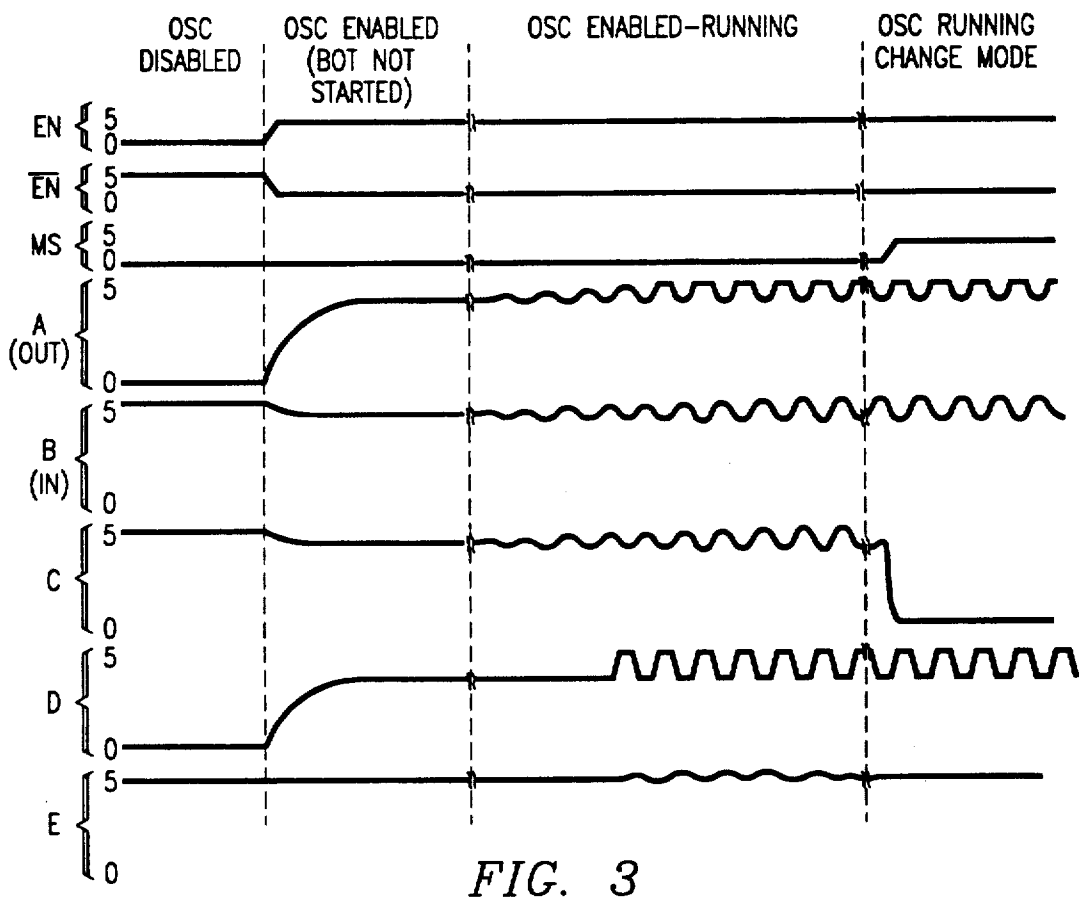
FIG. 3 shows timing diagrams of waveforms appearing at various points in the circuit of FIG. 1.

FIG. 3 shows samples of approximate waveforms appearing at various nodes shown in the circuit of FIG. 1, during the various modes of operation.

The first period shown, labelled "OSC DISABLED", represents periods when the oscillator is not being operated. At this time the enable signal EN is low (and its complement EN* is high), so that transmission gate 130 is turned off. PMOS transistor 133 is turned on (by the low level of signal EN), so that node B is pulled up to the positive supply voltage (5 V, in this example). PMOS transistors 142 and 112 are therefore turned hard off, so that no current will be drawn and no oscillation can occur. NMOS transistor 114 and 144 will be turned on, so that nodes A and D will be pulled down to virtual ground voltage $V_{SSH1}$. Since essentially no current is being drawn, no voltage drop will be present across resistor 120, and virtual ground voltage $V_{SSH1}$ will be at ground voltage (0 V).

The second period shown in FIG. 3, which is labelled "OSC ENABLED," represents the approximate timing relations after signal EN is driven high to start the oscillation. Transistor 133 turns off, and transmission gate 130 turns on, so that nodes A and B can move towards equal long-time-average voltages (which will be roughly equal to $V_{DD}-V_{TP}$). (As noted, transmission gate 130 is very long, so that nodes A and B are coupled with an effective time constant which is relatively long. As this occurs, current will be drawn through source resistor 120, so that voltage $V_{SSH1}$ also increases. These changes bring the oscillator to a condition where feedback can occur across amplifier 110. After some delay, oscillation therefore begins, at a frequency largely determined by the crystal 102. (The onset of oscillation is shown in the third period, labelled "OSC ENABLED - RUNNING.") As the amplitude of these oscillations increases, the AC signal on node B will eventually become large enough to begin switching devices 142 and 144. Since transistor 147 is turned hard on, the voltage on node C will be essentially equal to that on node B. Therefore, as the AC signal on node B increases, it will eventually become large enough to begin switching transistor 146 in phase with transistor 142 (which is controlled directly by node B). When all three of the transistors 142, 144, and 146 are being switched by the AC signal, an amplified signal will appear on node D (whose DC level has increased as virtual ground voltage $V_{SSH1}$ has increased).

Thus, the events during the second and third periods have established stable oscillation, at the desired frequency. Thereafter, during the fourth period (labelled "OSC RUNNING - CHANGE MODE), the mode-select signal MS is brought high, to change the mode of operation. This turns off PMOS transistor 147, and turns on NMOS transistor 148, so that node C (at the gate of PMOS pass transistor 146) is tied to ground. This keeps transistor 146 turned hard on, so that first-stage inverter 140 acts as if transistor 146 were shorted out, and a digital signal of the desired frequency continues to appear on node D.

In the presently preferred embodiment, the mode select signal MS is taken from a power fail monitoring signal. The system supply voltage is tracked and, when it falls below acceptable limits, the mode select signal is brought low. However, alternatively, of course, other sources could be used for this control signal.

The output of the first stage of the output buffer 140 (at node D) is connected to a second stage 150 of the output buffer. This second stage 150 is a more conventional CMOS inverter stage, except that the load transistor 152 and the driver transistor 154 are connected from the supply voltage only to the virtual ground $V_{SSH1}$, and not to the system ground. Similarly, in the presently preferred embodiment, a third stage 160 is connected to the output of the second stage 150. Thus, the output of the second 150 and third stage 160 provide complementary outputs from the oscillator, and thus provide complementary timing signals.

Some of the widths and lengths of important devices are as follows. These widths and lengths are specified in the presently preferred embodiment, and some of course, could be widely modified and varied. However, they will help to further illustrate, to those skilled in the art, the relation of the devices in the presently preferred embodiment.

The PMOS pass transistor 146 (in the first buffer stage 140) has a width of 30 microns and a length of 30 microns.

The PMOS mode-select transistor 146 has a width of 6.5 microns and a length of 2 microns.

The NMOS mode-select transistor 147 has a width of 6.5 microns and a length of 2 microns.

The PMOS load transistor 142 in the first buffer stage 140 has a width of 30 microns and a length of 6 microns.

The NMOS driver transistor 144 in the first buffer stage 140 has a width of 10 microns and a length of 6 microns.

The PMOS load transistor 152 in the second stage of the buffer has a width of 19.5 microns and a length of 2 microns.

The NMOS driver transistor 154 in the second stage of the buffer has a width of 6.5 microns and a length of 2 microns.

The PMOS pull-up transistor 112 in the amplifier 110 has a width of 60 microns and a length of 12 microns.

The NMOS pull-down transistor 114 in the amplifier 110 has a width of 20 microns and a length of 12 microns.

The PMOS transistor 132 in the transmission gate 130 has a width of 2.75 microns and a length of 2600 microns.

The NMOS transistor 134 in the transmission gate 130 has a width of 2.75 microns and a length of 2600 microns.

As is conventional in the art of timing circuits, flip-flops and counters are used to divide down the oscillator output to provide timing signals at desired intervals. In the presently preferred embodiment, the desired output frequency is 100 Hertz.

In the presently preferred embodiment, the output D has a frequency of $2^{15}$ per second (32.768 kHz). Three low-power flip-flop stages 170 (powered by $V_{DD}$ and $V_{SSH1}$) divide this down to 4096 Hertz.

To get the desired 100 Hertz output signal, a level-shifter and counter is used. Since 4096 is not an integer multiple of 100, the counter counts up to 41 for 24 counting cycles, and then counts up to 40 for every 25th counting cycle. This produces an output which includes phase error on 24 of every 25 output pulses, but which does have an average frequency of precisely 100 Hertz.

Of course, other subsystem configurations could be used instead. Depending on the relation of available crystal frequency to desired output frequency, some configurations do not require the non-integral division operation just described.

Figure 2:
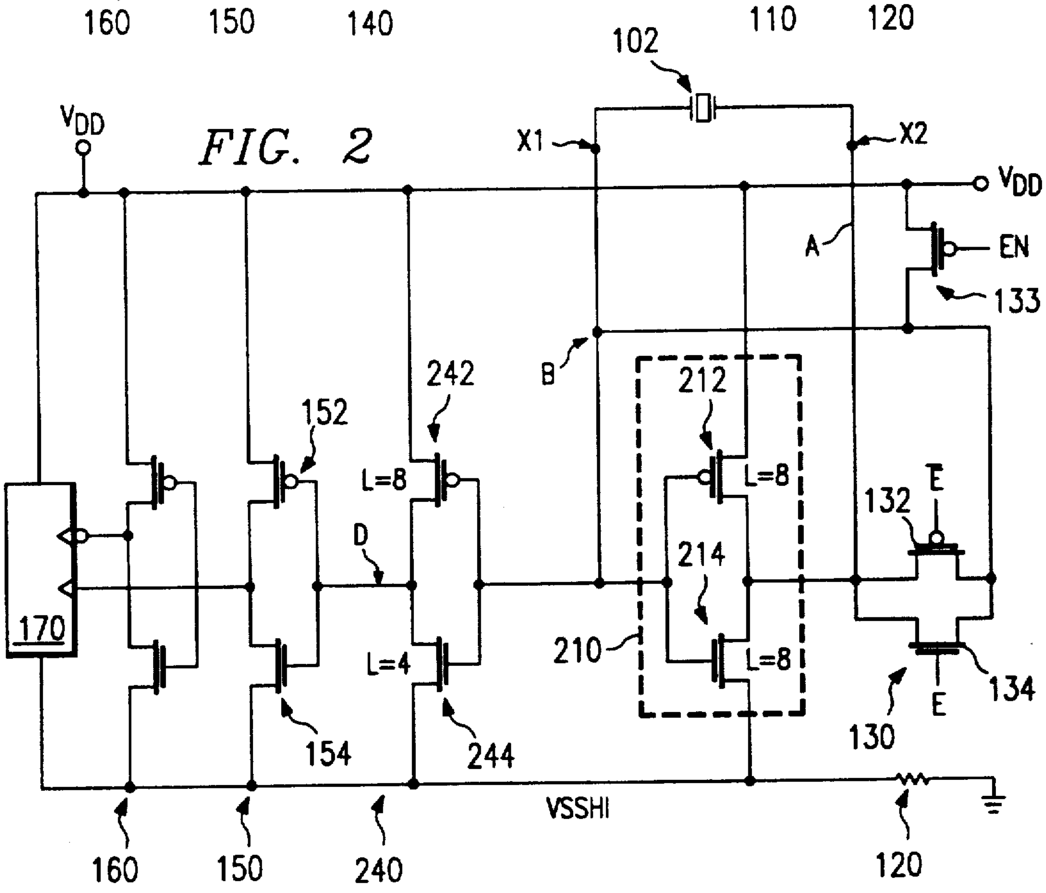
FIG. 2 shows an alternative, less preferred embodiment of a low power frequency-stabilized CMOS oscillator which can be used in the system of FIG. 4.

FIG. 2 shows an alternative, less preferred circuit configuration. Note that the first buffer stage 240 is asymmetrical, and the pass transistor 146 is omitted. In this embodiment, the NMOS driver transistor 244 is only 4 microns long, but the PMOS load transistor 242 is 8 microns long. The amplifier 210 uses 8 micron long transistors for pull-up 212 and pull-down 214.

In this embodiment, the load transistor 242 is made comparably long with pull-up 112, but driver 244 is made shorter than pull-down 114. This asymmetry helps to provide drive to the second stage, while adequately tracking the behavior of node A.

While the embodiment of FIG. 2 is believed to be novel, and may be advantageous in some applications, it has been found that the embodiment of FIG. 1 is more advantageous in the system context described.

Figure 5:
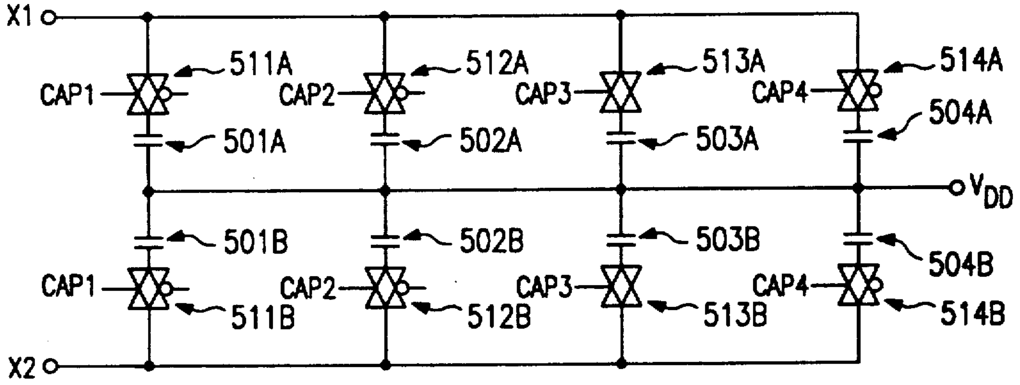
FIG. 5 shows the trimming capacitances used in the presently preferred embodiment.

FIG. 5 shows how capacitive trimming is preferably implemented, with trimming capacitor arrays available for connection to both input and output sides of the crystal. As shown in FIG. 5, the presently preferred embodiment uses a layout for trimming capacitors which provides selectable capacitors to be connected to both of the leads X1 and X2 of the crystal. The use of trimming capacitance to present an optimal load to a crystal resonator in a precision frequency-controlled oscillator circuit is well known to those skilled in the art, but in discrete configurations of such circuits it has not been practical to trim on both sides of the crystal. However, in integrated circuit embodiments, such as that of the present invention, this option can be used at little additional cost. The advantage of trimming on both sides of the crystal is that better loop gain can be maintained.

In the presently preferred embodiment, trimming is provided between the crystal connections X1 and the high supply voltage $V_{DD}$. However, alternatively, trimming capacitors to ground (or to a different reference voltage) could be used instead.

For each of the two crystal leads X1 and X2, four transmission gates 511A/B, 512A/B, 513A/B, and 514A/B are available to connect the line X1 or X2 to capacitors 501A/B, 502A/B, 503A/B, and/or 504A/B respectively. The transmission gates are paired, so that, for example, a high level on line CAP1 would turn on both transmission gate 511A (connecting line X1 to capacitor 501A) and transmission gate 511B (connecting line X2 to capacitor 501B). Similarly, line CAP2 controls both transmission gates 512A (connecting line X1 to capacitor 502A) and transmission gate 512B (connecting line X2 to capacitor 502B), and lines CAP3 and CAP4 are connected analogously. (Actually the signals CAP1 through CAP4 also have respective complementary signals CAP1* through CAP4*, which are connected to the inverting inputs of transmission gates 511A/B through 514A/B. However, for clarity, these additional lines are not shown.)

In the presently preferred embodiment, capacitors 501A through 504B are configured using gate oxides to silicon substrate. Using gate oxides of approximately 225 Angstroms thickness, the resulting specific capacitance is about 1.5 fF (femtoFarads) per square micron.

In the presently preferred embodiment, capacitors 501A and 501B have values of approximately 0.75 pF each, capacitors 502A and 502B have values of 1.37 pF each, capacitors 503A and 503B have values of approximately 2.3 pF each, and capacitors 504A and 504B have values of approximately 3.2 pF each. Two fixed load capacitors (of about 3.5 pF in this embodiment) are also connected to each of the crystal leads, in parallel with one of the trimming capacitor sets 501A–504A or 501B–504B. Of course, it will be readily understood by those skilled in the art that a tremendous variety of values could be used, and the foregoing numbers are provided simply for illustration.

After the integrated circuit is packaged, the static logic gates which switch these trimming capacitors in or out of the circuit will preferably be activated. Preferably, this is done by making a complete package, including a battery, an integrated circuit in a DIP (or other) package, and a crystal which is connected to the leads of the DIP package, and then checking the frequency of oscillation. (In test mode, two flip-flops are used to divide the frequency of oscillation by 4, and this 8 kHz signal is brought out to a pin.) Thus, the trimming capacitors can be used to jointly compensate any errors in the crystal resonant frequency and any deviations in the load capacitance seen by the crystal. A control signal sequence is then used to write appropriate bits into the static logic gates which select or deselect the trimming capacitors.

In the presently preferred embodiment, trimming capacitance is added in equal amounts on the input and output sides of the amplifier. However, alternatively, different trim capacitance values could be connected to the two sides, to provide a larger number of available increments of capacitance. In a further alternative (and less preferred) embodiment, trim capacitances could be added in increments to equalize the total capacitances (not merely the trim capacitances) on the two leads of the crystal. Depending on the circuit configuration and device dimensions chosen, the leads of the crystal may have capacitances which are initially unequal. (For example, one lead will normally be connected to the amplifier input, and will be loaded by the MOS gate capacitances of the amplifier and of the input to the following stage, and may therefore have a larger capacitance to ground.)

In the presently preferred embodiment, the trimming capacitance on each lead can be selected to be zero, or to have values ranging from about 0.75 pF to about 8 pF. Thus, the total added load capacitance (from the trimming capacitors plus the fixed load capacitor) on each of the crystal leads can be adjusted from about 3.5 pF to about 11 pF. This is in addition to the parasitic capacitances due to transistor gates, metallization, bonding leads, Miller capacitance, etc. The elements of the integrated circuit will typically provide about 6 pF of parasitic capacitance to each lead, in addition to the parasitic capacitance across the crystal (of about 1.5 pF). However, of course, a wide range of other values could be used.

Further description of various implementation features of the presently preferred embodiment, together with additional background on timekeeping circuits generally, may be found in the following applications of common assignee, which are hereby incorporated by reference:

Ser. No. 208,889, Filed Jun. 17, 1988 (LOW POWER TIMEKEEPING SYSTEM) now U.S. Pat. No. 5,050,113;

Ser. No. 208,891, Filed Jun. 17, 1988 (DYNAMIC PLA TIME CIRCUIT) now U.S. Pat. No. 4,959,646;

Ser. No. 208,287, Filed Jun. 17, 1988 (DYNAMIC CMOS BUFFER FOR LOW CURRENT SWITCHING) now U.S. Pat. No. 4,876,465; and Ser. No. 208,288, Filed Jun. 17, 1988 (DELAY CIRCUIT PROVIDING SEPARATE POSITIVE AND NEGATIVE GOING EDGE DELAYS) now abandoned.

As will be recognized by those skilled in the art, the present invention may be adapted to a wide range of system and subsystem embodiments.

The foregoing merely provide a few examples of the versatility of the disclosed innovative concepts. The embodiments specifically discussed are therefore to be understood as illustrative of the innovative concepts, and not limiting. The full scope of the innovative concepts is defined only by the claims of the issued patent.

What is claimed is:

1. An integrated circuit which maintains clock/calendar information, comprising:
 - a hardware timing circuit, connected to provide multiple clock pulses, at predetermined short intervals, per second;
 - a least-significant-field register, connected
   - to store bits corresponding to the least-significant bits of clock-calendar data which are desired to be monitored, and
   - to receive said clock pulses from said timing circuit, and
   - to increment said stored bits whenever one of said clock pulses is received, and
   - to generate a hardware interrupt whenever said stored bits are incremented up to a predetermined value; and
 - sequencing logic and an arithmetic/logic unit, jointly connected to programmably read, increment, and update a further plurality of clock/calendar data registers,
 - wherein said sequencing logic and arithmetic/logic unit are jointly connected and programmed to read and increment data in said further plurality of registers whenever said least-significant-field register generates said interrupt; and
 - wherein said sequencing logic and said arithmetic/logic unit are not connected to directly modify any of said bits of said least-significant-field register.

2. The integrated circuit of claim 1, wherein said predetermined value corresponds to a value at which the data in said least-significant-field register rolls over to generate an increment to the next higher level of data.

3. The integrated circuit of claim 1, wherein said least-significant-field register stores data corresponding to tenths and hundredths of a second, and wherein said sequencer updates said further plurality of registers with data bits corresponding to seconds, minutes, and hours.

4. The integrated circuit of claim 1, wherein said least-significant-field register stores data corresponding to fractions of a second, and wherein said sequencer updates said further plurality of registers with data bits corresponding to seconds, minutes, and hours.

5. The integrated circuit of claim 1, wherein said sequencer maintains said further plurality of registers with data corresponding to minutes, hours, days, months, and years.

6. The integrated circuit of claim 1, wherein said least-significant-field register stores data corresponding to thousandths of a second.

7. The integrated circuit of claim 1, wherein said least-significant-field register stores data in accordance with a binary-coded-decimal format.

8. The integrated circuit of claim 1, wherein said sequencer maintains data in said further plurality of registers in a binary-coded-decimal format.

9. The integrated circuit of claim 1, wherein said sequencing logic and arithmetic/logic unit, after receiving an increment command from said least-significant-field register, compare the updated values of said higher-order data with stored data corresponding to an alarm target value.

10. The integrated circuit of claim 1, wherein said sequencing logic and arithmetic/logic unit, after receiving an increment command from said least-significant-field register, compare the updated values of said higher-order data with stored alarm target data, and wherein said sequencing logic follows a programmed sequence of operations which is maximally branched at substantially each level of significance.

11. The integrated circuit of claim 1, wherein said sequencing logic and arithmetic/logic unit, in updating said further plurality of registers, follows a procedure which begins with least significant ones of data values in said further plurality of registers, and branches, after each stage of increasing significance, to increment the next higher level of significance only if a rollover increment was generated by the increment to the proceeding level of significance.

12. An integrated circuit which maintains clock/calendar information, comprising:

a hardware timing circuit, connected to provide multiple clock pulses, at predetermined short intervals, per second;

a least-significant-field register, connected to store bits corresponding to fractions of a second, to receive said clock pulses from said timing circuit, and to increment said stored bits whenever one of said clock pulses is received, and to generate a hardware interrupt whenever said stored bits are incremented up to a full second; and sequencing logic and an arithmetic/logic unit, jointly connected to programmably read, increment, and update a further plurality of clock/calendar data registers with data bits corresponding to seconds, minutes, hours, and days, wherein said sequencing logic and arithmetic/logic unit are jointly connected and programmed to read and increment seconds data in said further plurality of registers whenever said least-significant-field register generates said interrupt.

13. The integrated circuit of claim 12, wherein said least-significant-field register stores data corresponding to tenths and hundredths of a second, and wherein said sequencer updates said further plurality of registers with data bits corresponding to seconds, minutes, and hours.

14. The integrated circuit of claim 12, wherein said sequencer maintains said further plurality of registers with data corresponding to minutes, hours, days, months, and years.

15. The integrated circuit of claim 12, wherein said least-significant-field register stores data corresponding to thousandths of a second.

16. The integrated circuit of claim 12, wherein said least-significant-field register stores data in accordance with a binary-coded-decimal format.

17. The integrated circuit of claim 12, wherein said sequencer maintains data in said further plurality of registers in a binary-coded-decimal format.

18. An integrated circuit which maintains clock/calendar information, comprising:

a hardware timing circuit, connected to provide multiple clock pulses, at predetermined short intervals, per second;

a least-significant-field register, connected to store bits corresponding to the least-significant bits of clock-calendar data which are desired to be monitored, and to receive said clock pulses from said timing circuit, and to increment said stored bits whenever one of said clock pulses is received, and to generate a hardware interrupt whenever said stored bits are incremented up to a predetermined value; and sequencing logic and an arithmetic/logic unit, jointly connected to programmably read, increment, and update a further plurality of clock/calendar data registers, wherein said sequencing logic and arithmetic/logic unit are jointly connected and programmed to read and increment data in said further plurality of registers whenever said least-significant-field register generates said interrupt; and wherein said sequencing logic and said arithmetic/logic unit are not connected to directly modify any of said bits of said least-significant-field register;

wherein said timing circuit provides said clock pulses to multiple ones of said least-significant-field registers in parallel, and only one of said parallel least-significant-field registers can generate an interrupt to said sequencer.

19. The integrated circuit of claim 18, wherein said timing circuit provides increment commands to two of said least-significant-field registers in parallel.

20. The integrated circuit of claim 18, wherein said timing circuit provides increment commands to more than two of said least-significant-field registers in parallel.

* * * * *